US012191578B2

(12) United States Patent
Cai et al.

(10) Patent No.: US 12,191,578 B2
(45) Date of Patent: Jan. 7, 2025

(54) ANTENNA STRUCTURE AND ELECTRONIC DEVICE HAVING ANTENNA STRUCTURE

(71) Applicant: HONOR DEVICE CO., LTD., Shenzhen (CN)

(72) Inventors: Xiaotao Cai, Shenzhen (CN); Dawei Zhou, Shenzhen (CN); Yuanpeng Li, Shenzhen (CN); Tiezhu Liang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 65 days.

(21) Appl. No.: 17/786,788

(22) PCT Filed: Dec. 11, 2020

(86) PCT No.: PCT/CN2020/135927

§ 371 (c)(1),
(2) Date: Jun. 17, 2022

(87) PCT Pub. No.: WO2021/143419

PCT Pub. Date: Jul. 22, 2021

(65) Prior Publication Data

US 2023/0029513 A1 Feb. 2, 2023

(30) Foreign Application Priority Data

Jan. 17, 2020 (CN) ........................ 202010054712.7

(51) Int. Cl.
*H01Q 5/335* (2015.01)
*H01Q 1/24* (2006.01)
(Continued)

(52) U.S. Cl.
CPC ............ *H01Q 5/335* (2015.01); *H01Q 1/243* (2013.01); *H01Q 1/245* (2013.01); *H01Q 1/36* (2013.01);
(Continued)

(58) Field of Classification Search
CPC ............................... H01Q 1/243; H01Q 5/378
See application file for complete search history.

(56) References Cited

U.S. PATENT DOCUMENTS 7,450,072 B2 11/2008 Kim et al.
10,236,556 B2 3/2019 Chih et al.
(Continued)

FOREIGN PATENT DOCUMENTS

CN 106229674 A 12/2016
CN 107394347 A 11/2017
(Continued)

*Primary Examiner* — David E Lotter
*Assistant Examiner* — Aladdin Abdulbaki
(74) *Attorney, Agent, or Firm* — WOMBLE BOND DICKINSON (US) LLP

(57) ABSTRACT

The present invention provides an antenna structure, including a frame body, a first feed-in part, and a first connection part, where the frame body is at least partially made of a metal material, the frame body includes a first part and a second part, the second part is connected to one end of the first part, a length of the second part is greater than a length of the first part, a first slot is provided in the first part, a second slot is provided in the second part, a part of the frame body between the first slot and the second slot forms a first radiation part, the first feed-in part is disposed on the first radiation part and located on the first part of the frame body. The antenna structure can effectively improve low band radiation performance.

20 Claims, 11 Drawing Sheets

(51) Int. Cl.

| | |
|---|---|
| ***H01Q 1/36*** | (2006.01) |
| ***H01Q 1/44*** | (2006.01) |
| ***H01Q 1/50*** | (2006.01) |
| ***H01Q 5/10*** | (2015.01) |
| ***H01Q 5/28*** | (2015.01) |

(52) U.S. Cl.

CPC ................. *H01Q 1/44* (2013.01); *H01Q 1/50* (2013.01); *H01Q 5/10* (2015.01); *H01Q 5/28* (2015.01)

(56) References Cited

U.S. PATENT DOCUMENTS

| | | | | |
|---|---|---|---|---|
| 10,819,013 | B2 | 10/2020 | Lin | |
| 10,819,014 | B2 | 10/2020 | Gu et al. | |
| 10,819,017 | B2 | 10/2020 | Gu | |
| 2018/0026334 | A1* | 1/2018 | Chen | H01Q 5/371 343/702 |
| 2018/0070465 | A1* | 3/2018 | Cater | B29C 37/0082 |
| 2018/0375971 | A1 | 12/2018 | Sun et al. | |
| 2019/0348762 | A1* | 11/2019 | Chou | H01Q 5/328 |
| 2019/0393586 | A1 | 12/2019 | Ayala Vazquez et al. | |
| 2020/0007184 | A1* | 1/2020 | Jung | H04B 1/525 |
| 2022/0311127 | A1 | 9/2022 | Li et al. | |
| 2022/0345552 | A1 | 10/2022 | Wu et al. | |

FOREIGN PATENT DOCUMENTS

| | | | |
|---|---|---|---|
| CN | 107437661 | A | 12/2017 |
| CN | 107645034 | A | 1/2018 |
| CN | 108155485 | A | 6/2018 |
| CN | 108321501 | A | 7/2018 |
| CN | 109088152 | A | 12/2018 |
| CN | 109103569 | A | 12/2018 |
| CN | 109149115 | A | 1/2019 |
| CN | 109546305 | A | 3/2019 |
| CN | 208738425 | U | 4/2019 |
| CN | 208873874 | U | 5/2019 |
| CN | 209072551 | U | 7/2019 |
| CN | 106229674 | B | 8/2019 |
| CN | 110165373 | A | 8/2019 |
| CN | 110336116 | A | 10/2019 |
| CN | 110459856 | A | 11/2019 |
| CN | 110505325 | A | 11/2019 |
| CN | 110661084 | A | 1/2020 |
| KR | 20170130820 | A | 11/2017 |
| RU | 2386197 | C1 | 4/2010 |

* cited by examiner

ANTENNA STRUCTURE AND ELECTRONIC DEVICE HAVING ANTENNA STRUCTURE

CROSS-REFERENCE TO RELATED APPLICATIONS

This application is a National Stage of International Application No. PCT/CN2020/135927, filed on Dec. 11, 2020, which claims priority to Chinese Patent Application No. 202010054712.7, filed with the China National Intellectual Property Administration on Jan. 17, 2020, which are incorporated herein by references in their entireties.

TECHNICAL FIELD

The present invention relates to an antenna structure and an electronic device having the antenna structure.

BACKGROUND

Currently, to enhance a sense of quality of electronic devices such as mobile phones and personal digital assistants, metal is increasingly applied to industry design (ID) of the electronic devices, for example, a metal frame. In the industry design that uses the metal frame, designing the metal frame into an antenna becomes a direction of antenna design.

In the prior art, low band (LB) performance is implemented mainly by using a side longitudinal component, for example, a side inverted-F antenna (IFA) mode or an active antenna longitudinal mode. However, as big screens such as curved screens become popular, side metal frame bodies of mobile phones become thinner (narrower). Therefore, as curved screens approach the extreme and side frame bodies and side surroundings become weaker, antenna performance with a side frame body as a main radiation antenna declines sharply, and cannot meet a requirement for low band (LB) performance.

SUMMARY

In view of this, it is necessary to provide an antenna structure that can effectively improve low band (LB) radiation performance, and an electronic device having the antenna structure.

According to a first aspect, this application provides an antenna structure for an electronic device. The antenna structure includes a frame body, a first feed-in part, and a first connection part, where the frame body is at least partially made of a metal material, the frame body includes at least a first part and a second part, the second part is connected to one end of the first part, a length of the second part is greater than a length of the first part, a first slot is provided in the first part, a second slot is provided in the second part, a part of the frame body between the first slot and the second slot forms a first radiation part, the first feed-in part is disposed on the first radiation part and located on the first part of the frame body, the first feed-in part is electrically connected to a first feed to feed a current signal into the first radiation part, and the first connection part is disposed on the first radiation part and located on the second part of the frame body.

It may be learned that in the antenna structure provided in the first aspect, a low band (LB) bottom feed is used and has, different from an IFA mode, the characteristics of miniaturization and being mainly based on transverse components, thereby being less affected by side curved screens. In addition, side slots can help improve a side longitudinal component, so as to improve low band (LB) FS efficiency.

With reference to the first aspect, in some embodiments, the antenna structure further includes a first tuning unit, where one end of the first tuning unit is electrically connected to the first feed-in part, the other end is grounded, the first tuning unit includes a first tuning branch, a second tuning branch, and at least one first switch unit, the first tuning branch includes a capacitor or an inductor, and the second tuning branch includes a capacitor or an inductor. The first tuning unit is configured to perform port matching and tuning and frequency adjustment on the first radiation part.

With reference to the first aspect, in some embodiments, the antenna structure further includes a second tuning unit, where one end of the second tuning unit is electrically connected to the first connection part, the other end is grounded, the second tuning unit includes a third tuning branch, a fourth tuning branch, and at least one second switch unit, the third tuning branch includes a capacitor or an inductor, and the fourth tuning branch includes a capacitor or an inductor. The first connection part slightly adjusts a frequency and longitudinal component of the first radiation part by using the second tuning unit.

With reference to the first aspect, in some embodiments, a third slot is further provided in the first part, the third slot and the first slot are arranged at an interval, the first slot is closer to the second slot than the third slot, and a part of the frame body between the first slot and the third slot forms a parasitic stub of the first radiation part, so as to enable the antenna structure to generate an additional resonance. In addition, tuning is performed on the parasitic stub of the first radiation part, so that the additional resonance is shifted into an effective band of the first radiation part, and radiation efficiency of the first radiation part is improved.

With reference to the first aspect, in some embodiments, the frame body further includes a third part, where the third part and the second part face toward each other and are connected to the other end of the first part, a third slot is further provided in the first part, the third slot and the first slot are arranged at an interval, the first slot is closer to the second slot than the third slot, a ground point is disposed on the third part, a part of the frame body between the ground point and the third slot forms a second radiation part, the antenna structure further includes a second feed-in part, the second feed-in part is disposed on the second radiation part and located on the first part of the frame body, and the second feed-in part is electrically connected to a second feed to feed a current signal into the second radiation part.

With reference to the first aspect, in some embodiments, a part of the frame body between the first slot and the first connection part forms a parasitic stub of the second radiation part, and the parasitic stub of the second radiation part is configured to disperse distribution of current on the second radiation part. Therefore, a specific absorption rate of the second radiation part can be effectively reduced.

With reference to the first aspect, in some embodiments, the antenna structure further includes a second connection part, where the second connection part is disposed on the first radiation part and located on the second part of the frame body, a distance from the second connection part to the second slot is greater than a distance from the first connection part to the second slot, and the second connection part is grounded by using the second tuning unit. Frequency tuning is performed on the parasitic stub of the second radiation part by using the first tuning unit and the second tuning unit.

With reference to the first aspect, in some embodiments, the antenna structure further includes a third connection part and a third tuning unit, where the third connection part is disposed on the second radiation part and located on the first part of the frame body, the third connection part is closer to the third part than the second feed-in part, one end of the third tuning unit is electrically connected to the third connection part and the second feed-in part, the other end is grounded, the third tuning unit includes a fifth tuning branch, a sixth tuning branch, and at least one third switch unit, the fifth tuning branch includes a capacitor or an inductor, and the sixth tuning branch includes a capacitor or an inductor. The third tuning unit is configured to perform frequency tuning on the second radiation part.

With reference to the first aspect, in some embodiments, the frame body is a metal frame of the electronic device, that is, the antenna structure is a metal frame antenna, in this case, the first part is a bottom metal frame of the electronic device, and the second part is a side metal frame of the electronic device.

With reference to the first aspect, in some embodiments, the antenna structure is not limited to the metal frame antenna, and may alternatively be a mode decoration antenna (MDA) or another antenna. For example, when the antenna structure is an MDA antenna, a metal member in a chassis of an electronic device is used as a radiator to implement a radiation function. The chassis of the electronic device is made of a material such as plastic, and the metal member is integrated with the chassis through insert molding.

According to a second aspect, this application further provides an electronic device, including the antenna structure provided in the first aspect.

With reference to the second aspect, in some embodiments, the electronic device further includes a back plate and a display unit, where the back plate is disposed on an edge of the frame body, and the display unit is disposed on a side of the frame body away from the back plate. The back plate is made of metal or another conductive material. Certainly, the back plate may alternatively be made of an insulating material such as glass or plastic. That is, the antenna structure may be adapted to the electronic device with the back plate made of different materials. In addition, the antenna structure may be adapted to the electronic device with a large screen such as a curved screen and a thinner (narrower) side metal frame body.

According to a third aspect, this application further provides an electronic device. The electronic device includes an antenna structure, where the antenna structure includes a frame body, the frame body is at least partially made of a metal material, the frame body includes at least a first part, a second part, and a third part, the second part and the third part face toward each other and are connected to two ends of the first part, a length of the second part and a length of the third part are each greater than a length of the first part, a first slot, a second slot, and a third slot are provided in the frame body, the first slot and the third slot are provided in the first part at an interval, the second slot is provided in the second part, the first slot is closer to the second slot than the third slot, a part of the frame body between the first slot and the second slot forms a first radiation part, a ground point is disposed on the third part, a part of the frame body between the ground point and the third slot forms a second radiation part, a first feed-in part is disposed on the first radiation part, the first feed-in part is located on the first part of the frame body to feed a current signal into the first radiation part, a second feed-in part is disposed on the second radiation part, and the second feed-in part is located on the first part of the frame body to feed a current signal into the second radiation part.

With reference to the third aspect, in some embodiments, the antenna structure further includes a first tuning unit, where one end of the first tuning unit is electrically connected to the first feed-in part, the other end is grounded, the first tuning unit includes a first tuning branch, a second tuning branch, and at least one first switch unit, the first tuning branch includes a capacitor or an inductor, and the second tuning branch includes a capacitor or an inductor. The first tuning unit is configured to perform port matching and tuning and frequency adjustment on the first radiation part.

With reference to the third aspect, in some embodiments, the antenna structure further includes a first connection part, a second connection part, and a second tuning unit, where the first connection part and the second connection part are disposed on the first radiation part at an interval and located on the second part of the frame body, a distance from the second connection part to the second slot is greater than a distance from the first connection part to the second slot, one end of the second tuning unit is electrically connected to the first connection part and the second connection part, the other end is grounded, the second tuning unit includes a third tuning branch, a fourth tuning branch, and at least one second switch unit, the third tuning branch includes a capacitor or an inductor, and the fourth tuning branch includes a capacitor or an inductor. The first connection part slightly adjusts a frequency and longitudinal component of the first radiation part by using the second tuning unit.

With reference to the third aspect, in some embodiments, a part of the frame body between the first slot and the third slot forms a parasitic stub of the first radiation part, so as to enable the antenna structure to generate an additional resonance. In addition, tuning is performed on the parasitic stub of the first radiation part, so that the additional resonance is shifted into an effective band of the first radiation part, and radiation efficiency of the first radiation part is improved.

With reference to the third aspect, in some embodiments, a part of the frame body between the first slot and the first connection part forms a parasitic stub of the second radiation part, and the parasitic stub of the second radiation part is configured to disperse distribution of current on the second radiation part. Therefore, a specific absorption rate of the second radiation part can be effectively reduced. In addition, frequency tuning is performed on the parasitic stub of the second radiation part by using the first tuning unit and the second tuning unit.

With reference to the third aspect, in some embodiments, the antenna structure further includes a third connection part and a third tuning unit, where the third connection part is disposed on the second radiation part and located on the first part of the frame body, the third connection part is closer to the third part than the second feed-in part, one end of the third tuning unit is electrically connected to the third connection part and the second feed-in part, the other end is grounded, the third tuning unit includes a fifth tuning branch, a sixth tuning branch, and at least one third switch unit, the fifth tuning branch includes a capacitor or an inductor, and the sixth tuning branch includes a capacitor or an inductor. The third tuning unit is configured to perform frequency tuning on the second radiation part.

With reference to the third aspect, in some embodiments, the frame body is a metal frame of the electronic device, that is, the antenna structure is a metal frame antenna. In this case, the first part is a bottom metal frame of the electronic device, and the second part and the third part are side metal frames of the electronic device.

With reference to the third aspect, in some embodiments, the antenna structure is not limited to the metal frame antenna, and may alternatively be a mode decoration antenna (MDA) or another antenna. For example, when the antenna structure is an MDA antenna, a metal member in a chassis of an electronic device is used as a radiator to implement a radiation function. The chassis of the electronic device is made of a material such as plastic, and the metal member is integrated with the chassis through insert molding.

It may be learned that the antenna structure provided in the third aspect may implement both middle/high band (MHB) low SAR and low band (LB) radiation performance. That is, slot position and slot width of the antenna are designed, and frame body position and slot coupling current strength are adjusted, so as to affect a distribution concentrated and dispersed degree of current on the antenna frame body. The antenna structure provided in the third aspect increases a current distribution area of a middle/high band (MHB) (for example, adjusts an electrical length of the second radiation part) and also cooperates with a parasitic frame body of a middle/high band (MHB) to shunt current, so as to reduce the SAR. In addition, for a slot (that is, the second slot) provided in the side frame body, a low band (LB) bottom feed is used and has, different from an IFA mode, the characteristics of miniaturization and being mainly based on transverse components, thereby being less affected by side curved screens. Further, side slots can help improve a side longitudinal component; in addition, joint tuning of switches can improve low band (LB) FS efficiency and also adjust a middle/high band (MHB) parasitic resonance, so that characteristics of middle/high band (MHB) performance and low SAR are ensured, and power does not need to be greatly reduced to control the SAR.

DESCRIPTION OF REFERENCE SIGNS OF MAIN COMPONENTS

| | |
|---|---|
| Antenna structure | 100 |
| Housing | 11 |
| Frame | 111 |
| Back plate | 112 |
| First part | 115 |
| Second part | 116 |
| Third part | 117 |
| First slot | 120 |
| Second slot | 121 |
| Third slot | 122 |
| First radiation part | F1 |
| Second radiation part | F2 |
| First feed-in part | 12 |
| Second feed-in part | 13 |
| First connection part | 15 |
| Second connection part | 17 |
| Third connection part | 18 |
| Ground point | 19 |
| First tuning unit | SW1 |
| Second tuning unit | SW2 |
| Third tuning unit | SW3 |
| Switch | 61, 62, 63 |
| Tuning branch | L1, L2, L3 |
| Electronic device | 200 |
| Display unit | 201 |
| First feed | 202 |
| Second feed | 203 |
| First electronic element | 21 |
| Second electronic element | 22 |
| Third electronic element | 23 |

The present invention will be further described with reference to the accompanying drawings in the following specific embodiments.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be noted that when one element is, as stated, “electrically connected to” another element, the element may be directly on the another element, or there may be an element in between. When it is considered that one element is “electrically connected to” another element, it may be contact connection such as wire connection, or non-contact connection such as non-contact coupling.

Unless otherwise defined, all technical and scientific terms as used herein have the same meanings as those usually understood by a person skilled in the art of the present invention. The terms used in the specification of the present invention herein are for description of the particular embodiments only and are not intended to limit the present invention.

The following describes in detail some embodiments of the present invention with reference to the accompanying drawings. The following embodiments and features in the embodiments may be combined, provided that no conflict occurs.

Figure 1:
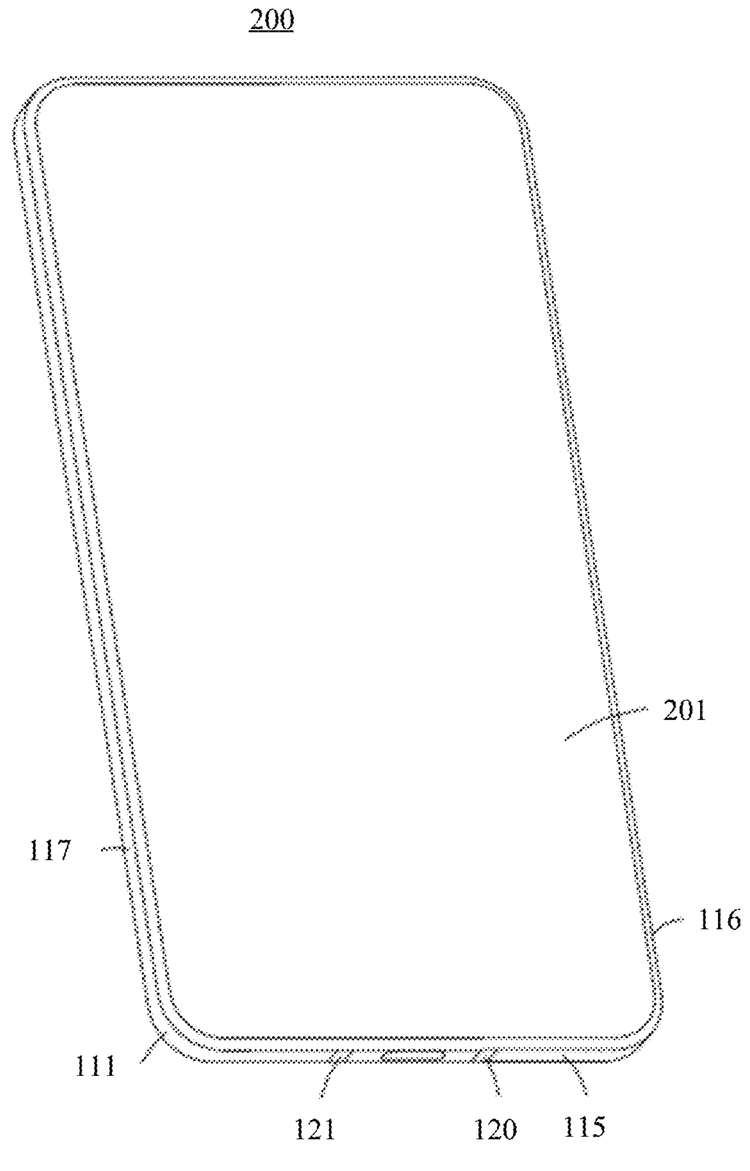
FIG. 1 is a schematic diagram of an antenna structure applied to an electronic device according to an example embodiment of the present invention.
Figure 2:
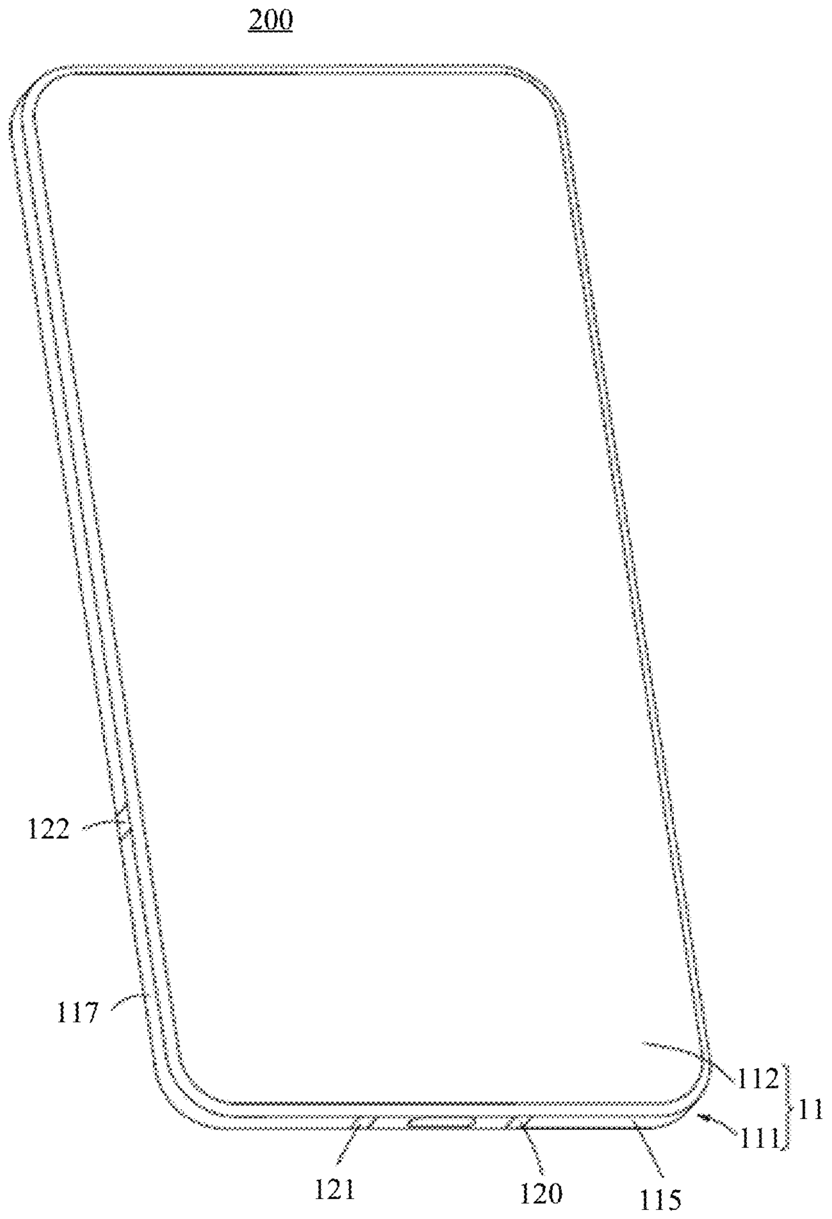
FIG. 2 is a schematic diagram of the electronic device shown in FIG. 1 from another angle.
Figure 3:
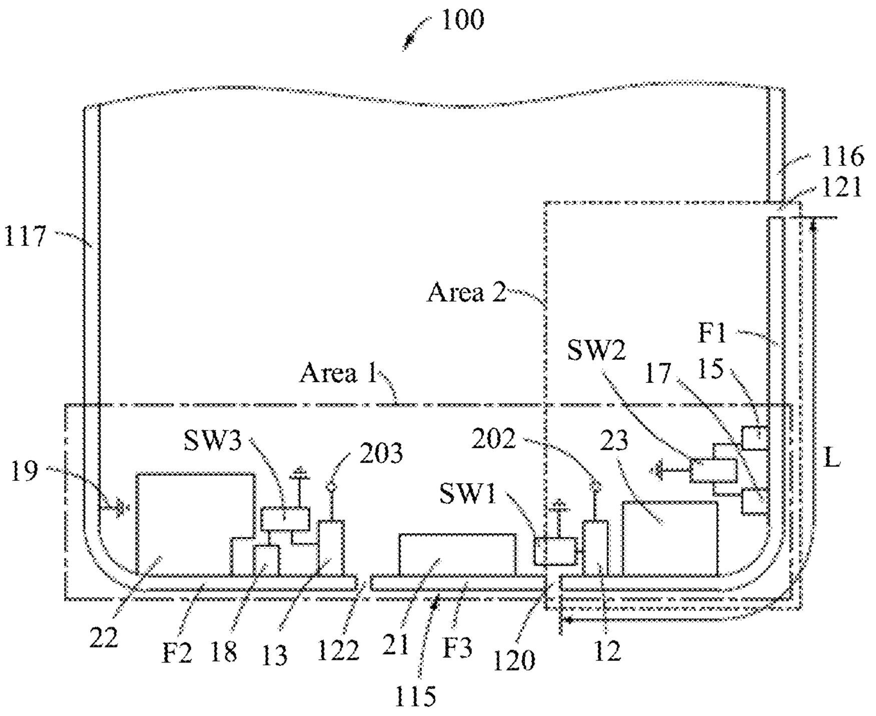
FIG. 3 is a circuit diagram of the antenna structure shown in FIG. 1.

Referring to FIG. 1 and FIG. 2, an example implementation of the present invention provides an antenna structure 100 (referring to FIG. 3). The antenna structure may be applied to an electronic device 200 such as a mobile phone, a tablet computer, or a personal digital assistant (personal digital assistant, PDA) and is configured to transmit and receive radio waves, so as to transmit and exchange radio signals.

It may be understood that the electronic device 200 may use one or more of the following communications technologies: a Bluetooth (BT) communications technology, a global positioning system (GPS) communications technology, a wireless fidelity (Wi-Fi) communications technology, a global system for mobile communications (GSM) communications technology, a wideband code division multiple access (WCDMA) communications technology, a long term evolution (LTE) communications technology, a 5G communications technology, a SUB-6G communications technology, another future communications technology, and the like.

The electronic device 200 includes a housing 11 and a display unit 201. The housing 11 includes at least a frame 111 and a back plate 112. The frame 111 is substantially of a ring structure and is made of metal or another conductive material. The back plate 112 is disposed on an edge of the frame 111. The back plate 112 may be made of metal or another conductive material. Certainly, the back plate 112 may alternatively be made of an insulating material such as glass or plastic.

It may be understood that, in this embodiment, an opening (not shown in the figure) is provided on a side of the frame 111 facing toward the back plate 112 and is configured to accommodate the display unit 201. It may be understood that the display unit 201 is provided with a display flat surface, and the display flat surface is exposed out of the opening. It may be understood that the display unit 201 may be combined with a touch sensor to form a touch screen. The touch sensor may also be referred to as a touch panel or a touch-sensitive panel.

Also referring to FIG. 3, the antenna structure 100 includes at least a frame body, a first feed-in part 12, a second feed-in part 13, a first connection part 15, a second connection part 17, and a third connection part 18.

The frame body is at least partially made of a metal material. In this embodiment, the frame body is the frame 111 of the electronic device 200. The frame 111 includes at least a first part 115, a second part 116, and a third part 117. In this embodiment, the first part 115 is a bottom end of the electronic device 200, that is, the first part 115 is a bottom metal frame of the electronic device 200. The antenna structure 100 forms a lower antenna of the electronic device 200. The second part 116 and the third part 117 face toward each other, are disposed at two ends of the first part 115 respectively, and are preferably arranged vertically. In this embodiment, a length of the second part 116 or a length of the third part 117 is greater than a length of the first part 115. That is, both the second part 116 and the third part 117 are side metal frames of the electronic device 200.

At least one slot is further provided in the frame 111. In this embodiment, three slots are provided in the frame 111: a first slot 120, a second slot 121, and a third slot 122. The first slot 120 and the third slot 122 are provided in the first part 115 at an interval. The second slot 121 is provided in the second part 116. The first slot 120 is closer to the second part 116 than the third slot 122. The third slot 122 is closer to the third part 117 than the first slot 120.

It may be understood that, in this embodiment, the antenna structure 100 further includes a ground point 19. The ground point 19 is disposed on the third part 117.

In this embodiment, the first slot 120, the second slot 121, and the third slot 122 all run through and cut off the frame 111. The at least one slot and the ground point 19 jointly mark out at least two radiation parts on the frame 111. In this embodiment, the first slot 120, the second slot 121, the third slot 122, and the ground point 19 jointly mark out a first radiation part F1 and a second radiation part F2 on the frame 111. In this embodiment, a part of the frame 111 between the first slot 120 and the second slot 121 forms the first radiation part F1. A part of the frame 111 between the third slot 122 and the ground point 19 forms the second radiation part F2. That is, the first radiation part F1 is disposed in a lower right corner of the electronic device 200 and is formed with a part of the first part 115 and a part of the second part 116. The second radiation part F2 is disposed in a lower left corner of the electronic device 200 and is formed with a part of the first part 115 and a part of the third part 117. An electrical length of the first radiation part F1 is greater than an electrical length of the second radiation part F2.

It may be understood that, in this embodiment, the first slot 120, the second slot 121, and the third slot 122 each are filled with insulating material such as plastic, rubber, glass, wood, or ceramic, but are not limited thereto.

It may be understood that, in this embodiment, a width of the first slot 120, a width of the second slot 121, and a width of the third slot 122 are all small, for example, may range from 0.5 millimeter (mm) to 2 mm. In a preferred solution, a width of the first slot 120, a width of the second slot 121, and a width of the third slot 122 each may be 0.8 mm, 1 mm, or 1.2 mm.

It may be understood that, in this embodiment, the first feed-in part 12 is located in the housing 11. The first feed-in part 12 is disposed on the first radiation part F1 and located on the first part 115. The first feed-in part 12 may be electrically connected to a first feed 202 by using a dome, a microstrip, a strip, a coaxial cable, or the like, to feed a current signal into the first radiation part F1.

The second feed-in part 13 is disposed in the housing 11. The second feed-in part 13 is disposed on the second radiation part F2 and located on the first part 115. The second feed-in part 13 may be electrically connected to a second feed 203 by using a dome, a microstrip, a strip, a coaxial cable, or the like, to feed a current signal into the second radiation part F2.

It may be understood that, in this embodiment, the first feed-in part 12 and the second feed-in part 13 may be made of a material such as iron, copper foil, or a conductor in a laser direct structuring (LDS) process.

The first connection part 15 is disposed on the first radiation part F1 and located on the second part 116. The second connection part 17 is disposed on the first radiation part F1 and located on the second part 116. That is, in this embodiment, the first connection part 15 and the second connection part 17 are disposed on the second part 116 at an interval, and a distance from the first connection part 15 to the second slot 121 is less than a distance from the second connection part 17 to the second slot 121. That is, the first connection part 15 is closer to the second slot 121 than the second connection part 17.

The third connection part 18 is disposed in the housing 11. In this embodiment, the third connection part 18 is disposed on the second radiation part F2 and located on the first part 115. The third connection part 18 is closer to the third part 117 than the second feed-in part 13.

It may be understood that, in this embodiment, an electrical length L (referring to FIG. 3) of the first radiation part F1 is adjusted, so that the electrical length L is approximately one-half of a wavelength corresponding to resonance frequency thereof. Therefore, when current is fed into the first feed-in part 12, the first radiation part F1 may generate a resonance by using a half wave mode. In this case, a radiation mode of the antenna structure 100 is a longitudinal mode. In addition, when current is fed into the first feed-in part 12, the first radiation part F1 may alternatively generate a resonance by using a composite right/left handed (CRLH) mode. In this case, a radiation mode of the antenna structure 100 is a transverse mode. That is, when current is fed into the first feed-in part 12, the first radiation part F1 may generate a radiation signal in a first radiation band by using both the CRLH mode and the half wave mode to initiate a first operating mode. In this embodiment, the first operating mode is a low band (LB) mode. Frequency of the first radiation band includes, but is not limited to bands such as LTE B28/B5/B8.

It may be understood that the longitudinal mode may refer to a radiation mode that the longitudinal side metal frame (for example, the second part 116) serves as a main radiator to radiate outward. The transverse mode may refer to a radiation mode that the transverse bottom metal frame (for example, the first part 115) serves as a main radiator to radiate outward.

It may be understood that when current is fed into the first feed-in part 12, the CRLH mode is used as a main resonance mode, and this mode has, different from the inverted F antenna (IFA) mode, the characteristics of miniaturization and being mainly based on transverse components, thereby being less affected by side radiators or curved screens. In addition, the antenna structure 100 with a slot (that is, the second slot 121) provided in its side, for example, the second part 116 may help improve a longitudinal component of a side radiator, so as to ensure that the antenna structure 100 has relatively good LB radiation performance.

When current is fed into the second feed-in part 13, the antenna structure 100 may generate a radiation signal in a second radiation band by using both the CRLH mode and a parasitic mode to initiate a second operating mode. The second operating mode is a medium/high band (middle/high band, MHB) mode. Frequency of the second radiation band includes, but is not limited to bands such as LTE B1/B3/B4/B7/B38/B39/B40/B41, WCDMA B1/B2, and GSM 1800/1900.

Figure 4A:
FIG. 4A to FIG. 4C are schematic diagrams of existing three antenna design solutions.
Figure 4B:
Figure 4C:
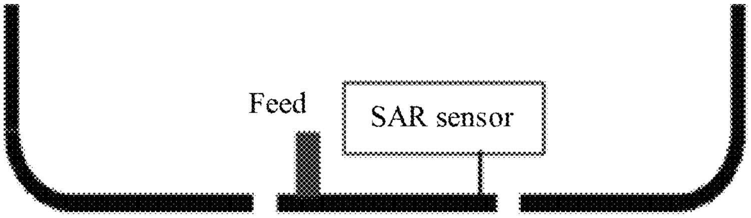

It may be understood that with the development of information technologies, the public enjoys convenience brought by the information technologies and also focuses on harm of electromagnetic radiation of wireless communications terminals to human bodies. A specific absorption rate (Specific Absorption Rate, SAR) is an important indicator of a mobile phone and also is the content that an antenna engineer pays the special attention to during antenna design. Generally, a total radiated power (Total Radiated Power, TRP) of the electronic device is closely associated with SAR. However, in actual antenna design, radiation power of a mobile phone is reduced to control the SAR under normal conditions. For example, FIG. 4A, FIG. 4B, and FIG. 4C are schematic diagrams of existing three antenna solutions. In the three antenna solutions, an SAR sensor (Sensor) is added for scenario determination to obtain different SAR values, and then radiation power of a mobile phone is reduced to meet an SAR requirement. However, only reducing radiation power of a mobile terminal to control the SAR damages radio performance of a product, affects user experience, and also reduces competitiveness of a product.

In the antenna structure 100, the second radiation part F2 uses two resonance modes, including a CRLH mode and a parasitic mode. The CRLH mode is located on a side of the second feed-in part 13 The CRLH mode is located on a same side as the second feed-in part 13. Therefore, a current distribution area of the CRLH mode is increased (for example, an electrical length of the second radiation part F2 is adjusted or increased), the parasitic mode of the second radiation part F2 strides across the first slot 120 and the third slot 122, and a part of the frame 111 between the first slot 120 and the first connection part 15 forms a parasitic stub, so as to disperse current distribution, so that the antenna structure 100 may operate on a middle/high band and has the characteristic of relatively low SAR without reducing its radiation power. That is, as shown in FIG. 3, an area 1 forms an MHB area of the antenna structure 100. That is, the second radiation part F2 is mainly in the CRLH mode, the parasitic mode of the second radiation part F2 strides across the first slot 120 and the third slot 122, so that a part of the frame 111 between the first slot 120 and the first connection part 15 forms a parasitic stub. In addition, in the figure, an area 2 forms an LB area of the antenna structure 100.

Figure 5A:
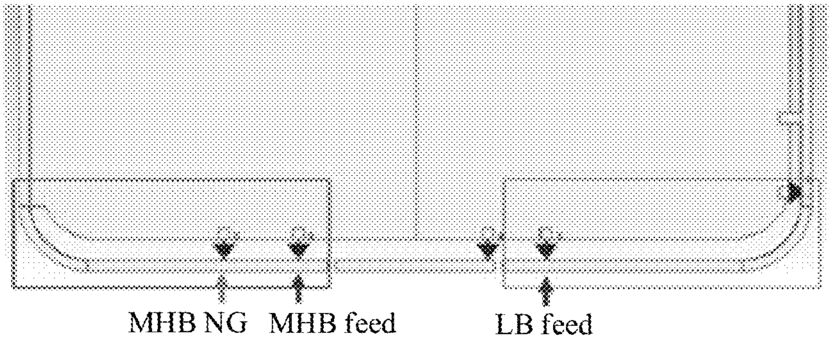
FIG. 5A to FIG. 5C are schematic diagrams of three different MHB design solutions.
Figure 5B:
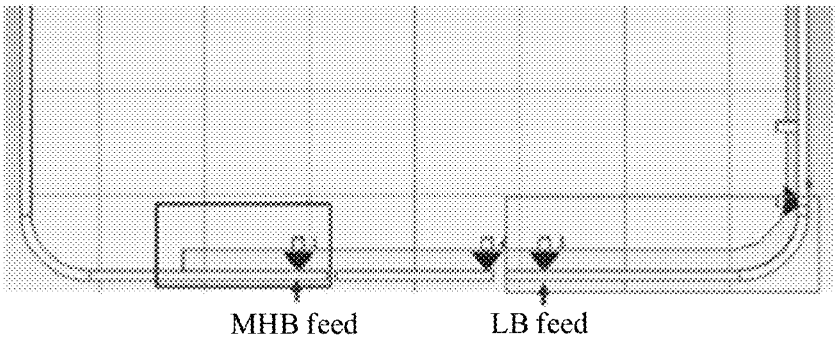
Figure 5C:
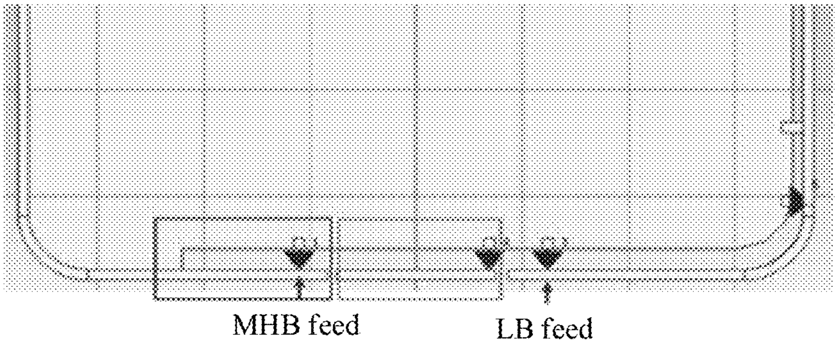

FIG. 5A, FIG. 5B, and FIG. 5C are schematic diagrams of three different MHB design solutions. FIG. 5A uses a long left handed and far parasitic mode, FIG. 5B uses a short left handed and far parasitic mode, and FIG. 5C uses a short left handed and near parasitic mode. Long left handed and short left handed mean that an electrical length of the second radiation part F2 in FIG. 5A is greater than an electrical length of the second radiation part F2 in FIG. 5B and FIG. 5C. Far parasitic and near parasitic refer to a parasitic stub farther away from the second radiation part F2 (for example, a part of the frame 111 between the first slot 120 and the first connection part 15, referring to FIG. 5A and FIG. 5B) and a parasitic stub nearer to the second radiation part F2 (for example, a part of the frame 111 between the first slot 120 and the third slot 122, referring to FIG. 5C), respectively. Clearly, it has been found through simulation for SAR values in the foregoing three solutions that, in the solution in the FIG. 5A (that is, the solution used in this specification), a component tangent to a magnetic field (H field) is more dispersed, and the characteristic of a relatively low SAR value is implemented.

It may be understood that, in this embodiment, the antenna structure 100 further includes a first tuning unit SW1, a second tuning unit SW2, and a third tuning unit SW3. One end of the first tuning unit SW1 is electrically connected to the first feed-in part 12, and the other end is grounded. The first tuning unit SW1 is configured to perform port matching and tuning and frequency adjustment on the first radiation part F1.

One end of the second tuning unit SW2 is electrically connected to the first connection part 15 and the second connection part 17. The other end of the second tuning unit SW2 is grounded.

It may be understood that, in this embodiment, the second tuning unit SW2 forms a multiplex switch, that is, the first connection part 15 and the second connection part 17 share the second tuning unit SW2. The first connection part 15 may be switched to different tuning branches by using the second tuning unit SW2, so as to adjust a frequency and longitudinal component. For example, the first connection part 15 may be switched or adjusted to a zero-ohm resistor or a 1-nanohenry (nH)/2-nH inductor by using the second tuning unit SW2, so as to slightly adjust a frequency and longitudinal component of the first radiation part F1. The second connection part 17 adjusts a parasitic resonance frequency of the second radiation part F2 by using the second tuning unit SW2.

One end of the third tuning unit SW3 is electrically connected to the second feed-in part 13 and the third connection part 18, and the other end is grounded. The third tuning unit SW3 is configured to perform frequency tuning on the CRLH mode of the second radiation part F2. In addition, frequency tuning may be performed on the parasitic mode of the second radiation part F2 by using the first tuning unit SW1. In a preferred solution auxiliary tuning may be further performed on the parasitic mode of the second radiation part F2 by using the second tuning unit SW2 on the basis of the first tuning unit SW1. That is, tuning is performed on the CRLH mode of the second radiation part F2 mainly by using the third tuning unit SW3. Tuning is performed on the parasitic mode of the second radiation part F2 by using the first tuning unit SW1 and the second tuning unit SW2.

Figure 6:
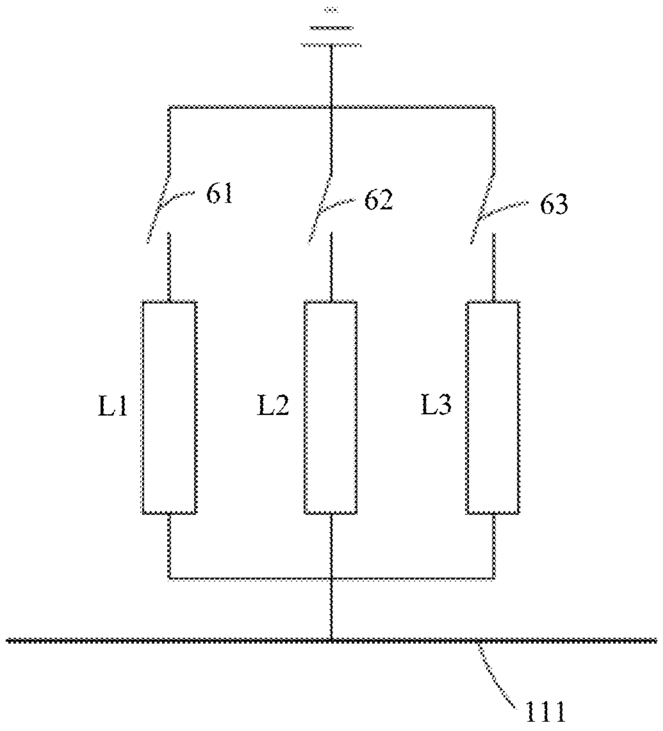
FIG. 6 is a schematic structural diagram of a switch unit shown in FIG. 3.

It may be understood that the foregoing tuning units, for example, the first tuning unit SW1, the second tuning unit SW2, and the third tuning unit SW3 each may, but are not limited to, be formed by combining a plurality of single pole single throw (single pole single throw, SPST) switches. For example, referring to FIG. 6, the tuning unit may include at least one switch unit, for example, three SPST switches: a switch 61, a switch 62, and a switch 63. One end of each switch unit is grounded, and the other end may be connected to a corresponding tuning branch. For example, the switch 61 is connected to a tuning branch L1, the switch 62 is connected to a tuning branch L2, and a switch 63 is connected to a tuning branch L3. The tuning branches L1, L2, and L3 each may include a capacitor or an inductor. The tuning units may selectively turn on different tuning branches to implement frequency adjustment.

Certainly, in other embodiments, the tuning units, for example, the first tuning unit SW1, the second tuning unit SW2, and the third tuning unit SW3 may further include another type of switch units, and are not limited to the foregoing SPST switches.

It may be understood that, in this embodiment, the antenna structure 100 cooperates with joint tuning of the tuning units, for example, the first tuning unit SW1, the second tuning unit SW2, and the third tuning unit SW3, so that free space (free space, FS) efficiency in the low band mode can be improved. In addition, parasitic resonance in a middle/high band mode can be adjusted, so that performance and low SAR characteristic in the middle/high band mode are ensured.

It may be understood that FS efficiency refers to efficiency of the antenna structure 100 in the low band mode when the electronic device 200 is not held by a user.

Figure 7:
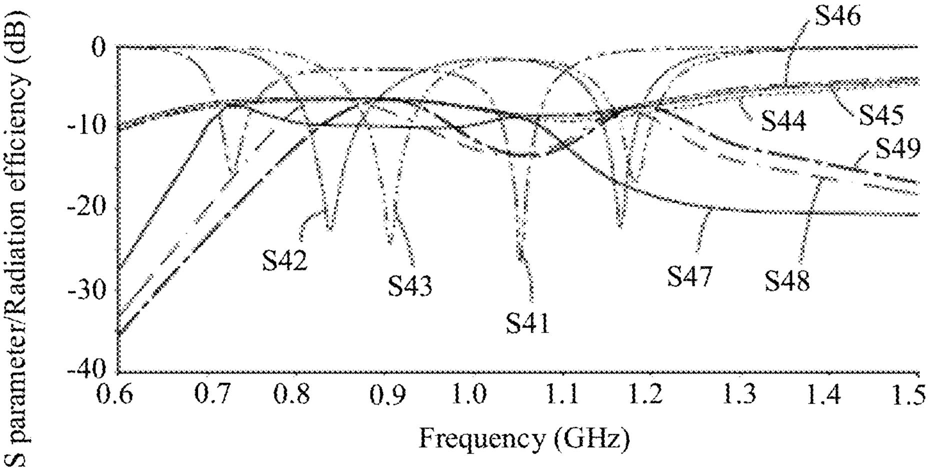
FIG. 7 is a curve graph of S parameter (scattering parameter) and radiation efficiency of the antenna structure shown in FIG. 1 operating in a low band mode.

FIG. 7 is a curve graph of S parameter (scattering parameter) and radiation efficiency of the antenna structure 100 operating in a low band mode. A curve S41 indicates S11 values of the antenna structure 100 operating on an LTE B28 band. A curve S42 indicates the S11 values of the antenna structure 100 operating on an LTE B5 band. A curve S43 indicates the S11 values of the antenna structure 100 operating on an LTE B8 band. A curve S44 indicates radiation efficiency of the antenna structure 100 operating on an LTE B28 band. A curve S45 indicates the radiation efficiency of the antenna structure 100 operating on the LTE B5 band. A curve S46 indicates the radiation efficiency of the antenna structure 100 operating on the LTE B8 band. A curve S47 indicates system efficiency of the antenna structure 100 operating on the LTE B28 band. A curve S48 indicates the system efficiency of the antenna structure 100 operating on the LTE B5 band. A curve S49 indicates the system efficiency of the antenna structure 100 operating on the LTE B8 band.

Figure 8:
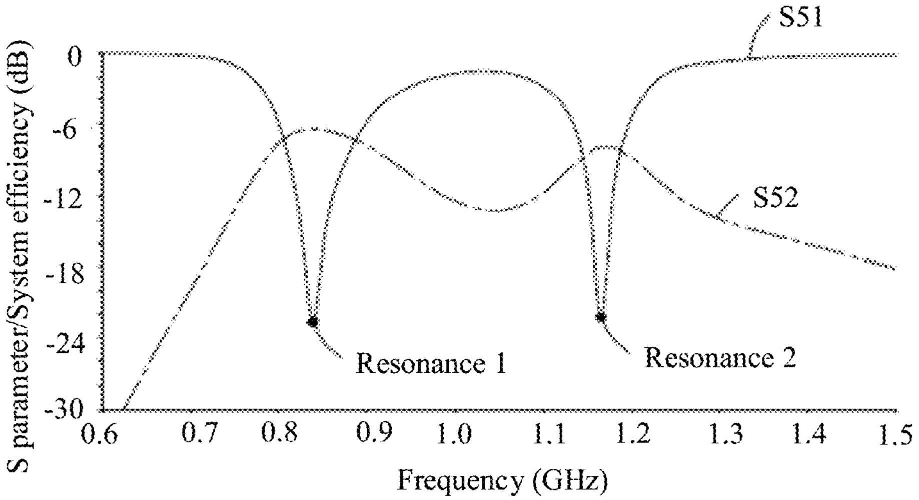
FIG. 8 is a curve graph of S parameter (scattering parameter) and system efficiency of the antenna structure shown in FIG. 1 operating on an LTE B5 band.

FIG. 8 is a curve graph of S parameter (scattering parameter) and system efficiency of the antenna structure 100 operating on an LTE B5 band. A curve S51 indicates S11 values of the antenna structure 100 operating on the an LTE B5 band. A curve S52 indicates system efficiency of the antenna structure 100 operating on the LTE B5 band.

Figure 9:
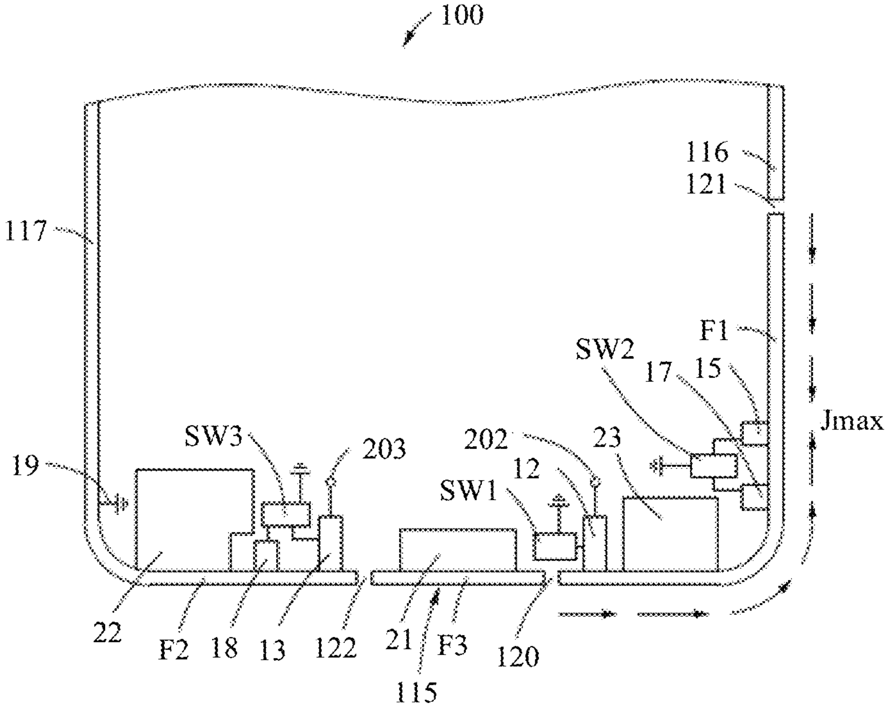
FIG. 9 is a schematic current diagram of a resonance 1 of the antenna structure shown in FIG. 8 operating on an LTE B5 band.
Figure 10:
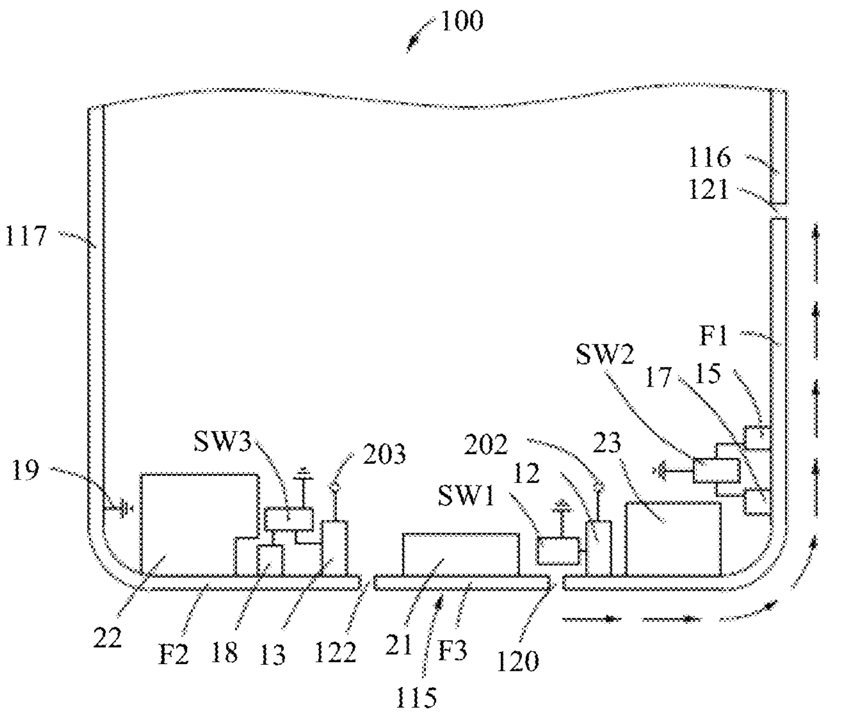
FIG. 10 is a schematic current diagram of a resonance 2 of the antenna structure shown in FIG. 8 operating on an LTE B5 band.

FIG. 9 is a schematic current diagram of a resonance 1 of the antenna structure 100 operating on an LTE B5 band. FIG. 10 is a schematic current diagram of a resonance 2 of the antenna structure 100 operating on an LTE B5 band. It may be learned from FIG. 8 and FIG. 9 that as the first radiation part F1 performs feeding at the bottom, the resonance 1 radiates mainly by using the CRLH mode, that is, the transverse mode. In addition, in a side grounding position of the antenna structure 100, that is, a position of the first connection part 15 and the second connection part 17, the frame body (that is, the first radiation part F1) is in an antenna large-current area to form a maximum current density Jmax. Therefore, a parasitic resistor that includes the second tuning unit SW2 greatly affects low band efficiency of the antenna structure 100. It may be learned from FIG. 8 and FIG. 10 that when the first radiation part F1 operates at the resonance 2, the resonance 2 radiates mainly by using the half wave mode, that is, the longitudinal mode. In addition, current is fed into the first feed-in part 12, flows through the first radiation part F1, and then radiates out of the first slot 120 and the second slot 121 in two ends of the first radiation part F1.

Figure 11:
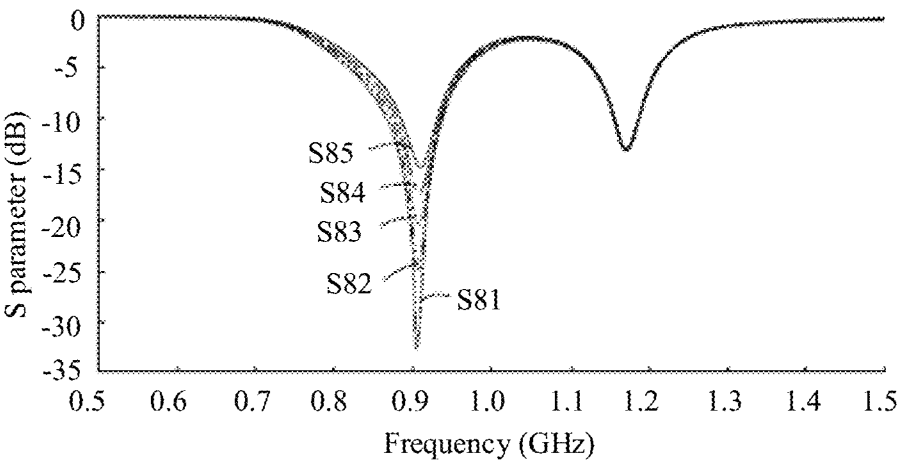
FIG. 11 is a curve graph of S parameter (scattering parameter) of an antenna structure when a first connection part shown in FIG. 3 is connected to different on-resistance (Ron)
Figure 12:
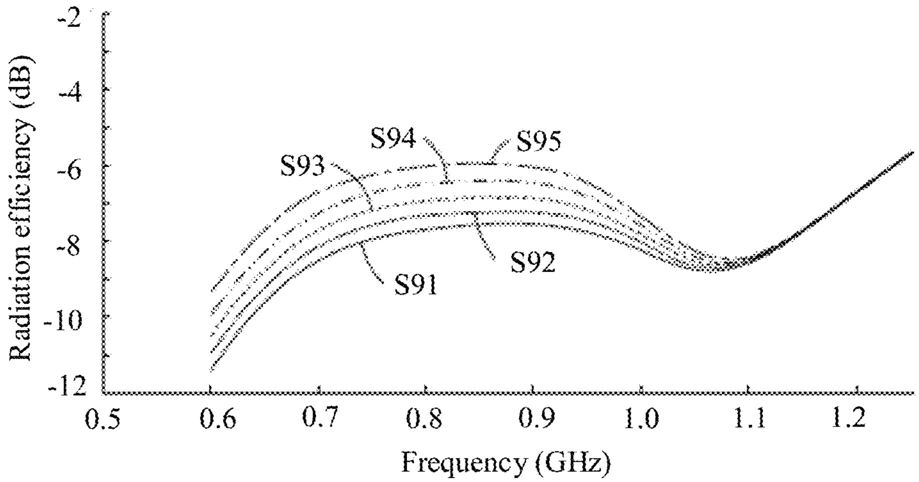
FIG. 12 is a curve graph of radiation efficiency of an antenna structure when a first connection part shown in FIG. 3 is connected to different on-resistance (Ron)

FIG. 11 and FIG. 12 each illustrate an effect of on-resistance (Ron), generated by the first connection part 15 connected to the second tuning unit SW2, on antenna performance. A curve S81 indicates S11 values of the antenna structure 100 when on-resistance (Ron) is 2 ohms. A curve S82 indicates the S11 values of the antenna structure 100 when on-resistance (Ron) is 1.5 ohms. A curve S83 indicates the S11 values of the antenna structure 100 when on-resistance (Ron) is 1 ohm. A curve S84 indicates the S11 values of the antenna structure 100 when on-resistance (Ron) is 0.5 ohm. A curve S85 indicates the S11 values of the antenna structure 100 when on-resistance (Ron) is 0 ohms. A curve S91 indicates radiation efficiency of the antenna structure 100 when on-resistance (Ron) is 2 ohms. A curve S92 indicates the radiation efficiency of the antenna structure 100 when on-resistance (Ron) is 1.5 ohms. A curve S93 indicates the radiation efficiency of the antenna structure 100 when on-resistance (Ron) is 1 ohm. A curve S94 indicates the radiation efficiency of the antenna structure 100 when on-resistance (Ron) is 0.5 ohm. A curve S95 indicates the radiation efficiency of the antenna structure 100 when on-resistance (Ron) is 0 ohms.

Clearly, it may be learned from FIG. 11 and FIG. 12 that when on-resistance (Ron) is 2 ohms, the effect is approximately 1.6 dB. When on-resistance (Ron) is 1 ohm, the effect is approximately 0.9 dB. That is, an effect of on-resistance (Ron) of the first connection part 15 on antenna efficiency is relatively large. Therefore, in this embodiment, for a low band (LB), the first connection part 15 may be designed to be directly grounded, for example, directly grounded by using a zero-ohm resistor other than on-resistance (Ron) of the second tuning unit SW2.

Figure 13:
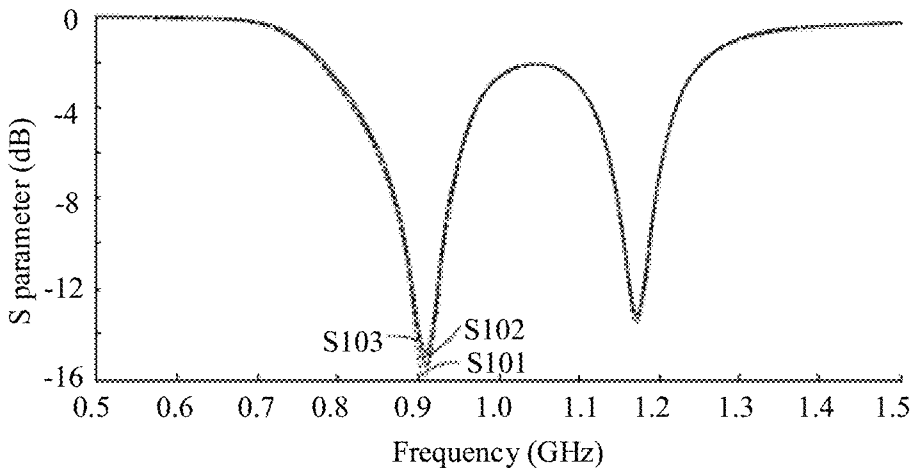
FIG. 13 is a curve graph of S parameter (scattering parameter) of an antenna structure when a second connection part shown in FIG. 3 is connected to different on-resistance (Ron)
Figure 14:
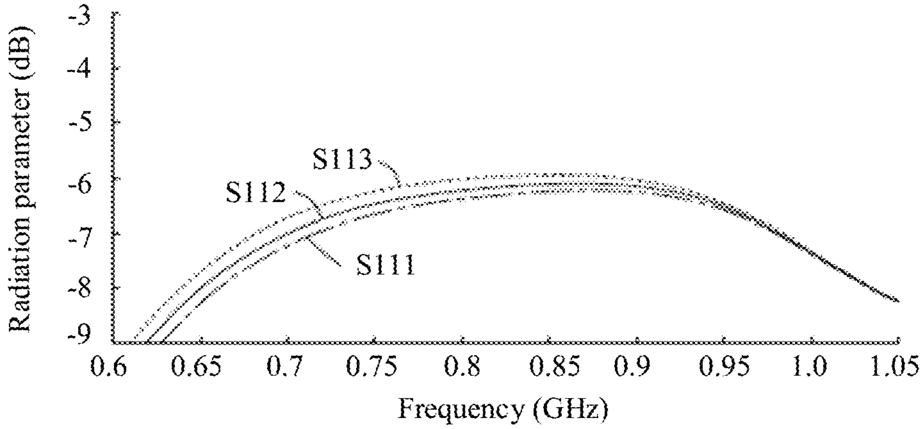
FIG. 14 is a curve graph of radiation efficiency of an antenna structure when a second connection part shown in FIG. 3 is connected to different on-resistance (Ron)

FIG. 13 and FIG. 14 each illustrate an effect of on-resistance (Ron), generated by the second connection part 17 connected to the second tuning unit SW2, on antenna performance. A curve S101 indicates S11 values of the antenna structure 100 when on-resistance (Ron) is 2 ohms. A curve S102 indicates the S11 values of the antenna structure 100 when on-resistance (Ron) is 1 ohm. A curve S103 indicates the S11 values of the antenna structure 100 when on-resistance (Ron) is 0 ohms. A curve S111 indicates radiation efficiency of the antenna structure 100 when on-resistance (Ron) is 2 ohms. A curve S112 indicates the radiation efficiency of the antenna structure 100 when on-resistance (Ron) is 1 ohm. A curve S113 indicates the radiation efficiency of the antenna structure 100 when on-resistance (Ron) is 0 ohms.

Clearly, it may be learned from FIG. 13 and FIG. 14 that when the second tuning unit SW2 uses three single pole single throw (single pole single throw, SPST) switches, on-resistance (Ron) of the second tuning unit SW2 is 2 ohms, and an effect is approximately 0.4 dB. When the second tuning unit SW2 uses four SPST switches, on-resistance (Ron) of the second tuning unit SW2 is 1 ohm, and an effect is approximately 0.2 dB. That is, an effect of the second connection part 17 on the antenna structure 100 is relatively small. Therefore, switches with relatively small on-resistance (Ron), for example, 4SPST switches may be selected, so as to reduce an effect of on-resistance (Ron) of the second connection part 17 on antenna efficiency when the first tuning unit SW1 is used to perform port tuning in a low band.

Figure 15:
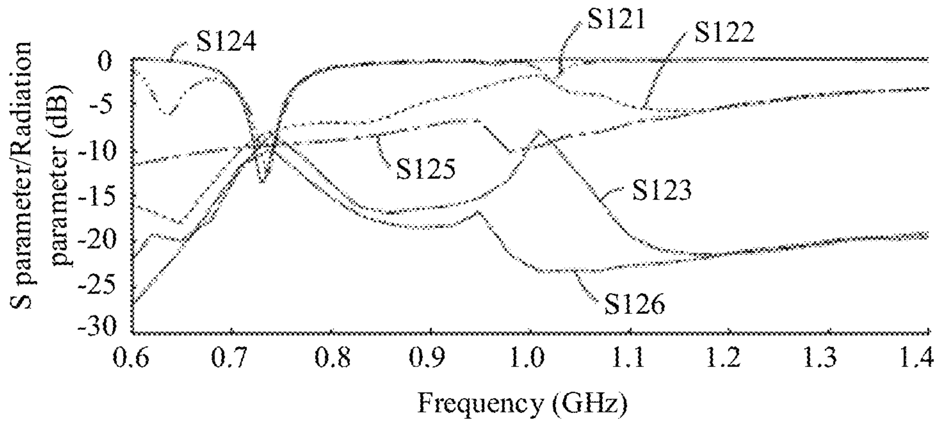
FIG. 15 is a curve graph of S parameter (scattering parameter) and radiation efficiency of the antenna structure shown in FIG. 1 operating on an LTE B28 band when a second slot is provided or a second slot is not provided on a side.

It may be understood that FIG. 15 is a curve graph of S parameter (scattering parameter) and radiation efficiency of the antenna structure 100 operating on an LTE B28 band when the antenna structure 100 is provided with a second slot 121 or not provided with a second slot 121 on a side. A curve S121 indicates S11 values of the antenna structure 100 operating on an LTE B28 band when the second slot 121 is provided. A curve S122 indicates radiation efficiency of the antenna structure 100 operating on an LTE B28 band when the second slot 121 is provided. A curve S123 indicates system efficiency of the antenna structure 100 operating on an LTE B28 band when the second slot 121 is provided. A curve S124 indicates the S11 values of the antenna structure 100 operating on an LTE B28 band when the second slot 121 is not provided. A curve S125 indicates the radiation efficiency of the antenna structure 100 operating on an LTE B28 band when the second slot 121 is not provided. A curve S126 indicates the system efficiency of the antenna structure 100 operating on an LTE B28 band when the second slot 121 is not provided.

Figure 16:
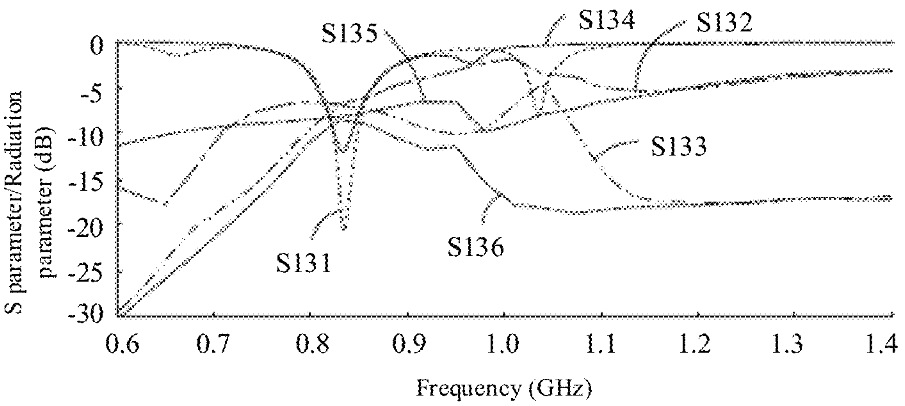
FIG. 16 is a curve graph of S parameter (scattering parameter) and radiation efficiency of the antenna structure shown in FIG. 1 operating on an LTE B5 band when a second slot is provided or a second slot is not provided on a side.

FIG. 16 is a curve graph of S parameter (scattering parameter) and radiation efficiency of the antenna structure 100 operating on an LTE B5 band when the antenna structure 100 is provided with a second slot 121 or not provided with a second slot 121 on a side. A curve S131 indicates S11 values of the antenna structure 100 operating on an LTE B5 band when the second slot 121 is provided. A curve S132 indicates radiation efficiency of the antenna structure 100 operating on the LTE B5 band when the second slot 121 is provided. A curve S133 indicates system efficiency of the antenna structure 100 operating on the LTE B5 band when the second slot 121 is provided. A curve S134 indicates the S11 values of the antenna structure 100 operating on the LTE B5 band when the second slot 121 is not provided. A curve S135 indicates the radiation efficiency of the antenna structure 100 operating on the LTE B5 band when the second slot 121 is not provided. A curve S136 indicates the system efficiency of the antenna structure 100 operating on the LTE B5 band when the second slot 121 is not provided.

Figure 17:
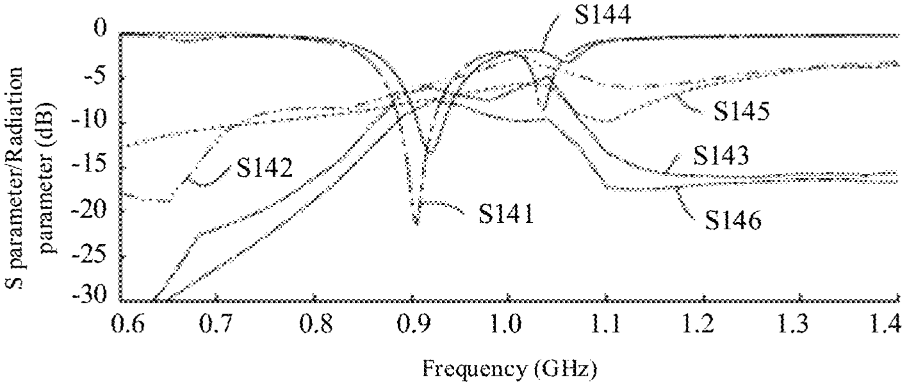
FIG. 17 is a curve graph of S parameter (scattering parameter) and radiation efficiency of the antenna structure shown in FIG. 1 operating on an LTE B8 band when a second slot is provided or a second slot is not provided on a side.

FIG. 17 is a curve graph of S parameter (scattering parameter) and radiation efficiency of the antenna structure 100 operating on an LTE B8 band when the antenna structure 100 is provided with a second slot 121 or not provided with a second slot 121 on a side. A curve S141 indicates S11 values of the antenna structure 100 operating on an LTE B8 band when the second slot 121 is provided. A curve S142 indicates radiation efficiency of the antenna structure 100 operating on an LTE B8 band when the second slot 121 is provided. A curve S143 indicates system efficiency of the antenna structure 100 operating on an LTE B8 band when the second slot 121 is provided. A curve S144 indicates the S11 values of the antenna structure 100 operating on an LTE B8 band when the second slot 121 is not provided. A curve S145 indicates the radiation efficiency of the antenna structure 100 operating on an LTE B8 band when the second slot 121 is not provided. A curve S146 indicates the system efficiency of the antenna structure 100 operating on an LTE B8 band when the second slot 121 is not provided.

Clearly, it may be learned from FIG. 15 to FIG. 17 that when the antenna structure 100 is provided with the second slot 121, low band (LB) performance of the antenna structure 100 is improved by 1 dB to 1.5 dB compared with an existing solution in which the slot is not provided, and relatively good FS performance is implemented.

It may be understood that referring back to FIG. 3, in this embodiment, the electronic device 200 further includes at least one electronic element. In this embodiment, the electronic device 200 includes at least three electronic elements: a first electronic element 21, a second electronic element 22, and a third electronic element 23. The first electronic element 21, the second electronic element 22, and the third electronic element 23 are all disposed in the housing 11.

In this embodiment, the first electronic element 21 is a universal serial bus (Universal Serial Bus, USB) interface module. The first electronic element 21 is located between the first slot 120 and the third slot 122. The second electronic element 22 is a sound cavity. The second electronic element 22 is disposed between the third slot 122 and the third part 117. The third electronic element 23 is a subscriber identity module (Subscriber Identity Module, SIM) card holder. The third electronic element 23 is disposed between the third first feed-in part 12 and the second part 116.

Figure 18:
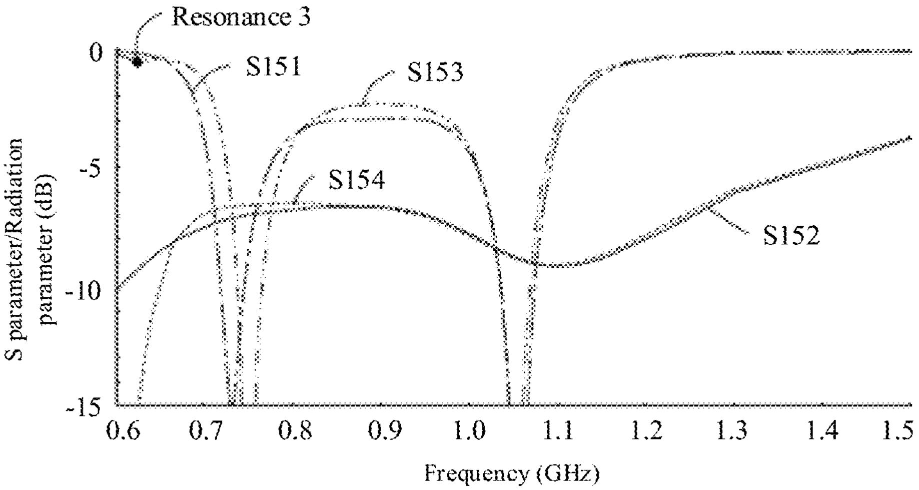
FIG. 18 is a curve graph of S parameter (scattering parameter) and radiation efficiency of the antenna structure operating on an LTE B28 band when a part of a frame body between a first slot and a third slot in the antenna structure shown in FIG. 3 serves as a parasitic stub.

It may be understood that, in other embodiments, a part of the frame 111 between the first slot 120 and the third slot 122 in the antenna structure 100 may alternatively form a parasitic stub F3 in a low band mode. The parasitic stub F3 is spaced from both the first radiation part F1 and the second radiation part F2, that is, arranged in an overhanging manner. FIG. 18 is a curve graph of S parameter (scattering parameter) and radiation efficiency of the antenna structure 100 operating on an LTE B28 band when tuning is performed or not performed on the parasitic stub F3. A curve S151 indicates S11 values of the antenna structure 100 operating on an LTE B28 band when tuning is not performed on the parasitic stub F3. A curve S152 indicates radiation efficiency of the antenna structure 100 operating on an LTE B28 band when tuning is not performed on the parasitic stub F3. A curve S153 indicates the S11 values of the antenna structure 100 operating on an LTE B28 band when tuning is performed on the parasitic stub F3. A curve S154 indicates the radiation efficiency of the antenna structure 100 operating on an LTE B28 band when tuning is performed on the parasitic stub F3.

Clearly, when a part of the frame 111 between the first slot 120 and the third slot 122 in the antenna structure 100 forms the parasitic stub F3 in a low band mode, the antenna structure 100 may generate an additional resonance 3. It may be learned from FIG. 18 that when tuning is performed on the parasitic stub F3, the resonance 3 may be shifted into an effective band of the first radiation part F1, and radiation efficiency in the LTE B28 band is improved significantly.

It may be understood that, in an embodiment, tuning may be performed on the parasitic stub F3 in a low band mode by using the first tuning unit SW1, that is, multiplexing the first tuning unit SW1. Certainly, in other embodiments, a corresponding switch unit may also be additionally arranged, to perform tuning on the parasitic stub F3 in a low band mode.

It may be understood that, in this embodiment, the second radiation part F2 is disposed on a same side as the second electronic element 22. Certainly, in other embodiments, position of the second radiation part F2 may be adjusted as needed. For example, the second radiation part F2 may be disposed on a same side as the third electronic element 23, while the first radiation part F1 is disposed on a side of the second electronic element 22. That is, positions of the first radiation part F1 and the second radiation part F2 may be adjusted (for example, be interchanged) as needed.

It may be understood that, in this embodiment, the antenna structure 100 performs separate feeding by using a low band and middle/high band separate feed-in mode, that is, by using the first feed-in part 12 and the second feed-in part 13, and is provided with the first tuning unit SW1, the second tuning unit SW2, and the third tuning unit SW3. An on-off state of the first tuning unit SW1, an on-off state of the second tuning unit SW2, and an on-off state of the third tuning unit SW3 are controlled/adjusted, so that full coverage of LB/MB/HB is effectively implemented, and also a middle/high band (MHB) low SAR characteristic and relatively good low band (LB) radiation performance are implemented.

It may be understood that, as described above, in this embodiment, the frame body of the antenna structure 100 is directly formed by the frame 111 of the electronic device 200, that is, the chassis (frame) of the electronic device 200 is made of a metal material, and the antenna structure 100 is a metal frame antenna. Certainly, in other embodiments, the antenna structure 100 is not limited to the metal frame antenna, and may alternatively be a mode decoration antenna (MDA) or another antenna. For example, when the antenna structure 100 is an MDA antenna, a metal member in the chassis of the electronic device 200 is used as the frame body to implement a radiation function. The chassis of the electronic device 200 is made of an insulating material such as plastic, and the metal member is integrated with the chassis through insert molding.

In conclusion, as full curved screens approach the extreme, the antenna structure 100 in the present invention may implement both middle/high band (MHB) low SAR and low band (LB) radiation performance. That is, slot position and slot width of the antenna are designed, and frame body position and slot coupling current strength are adjusted, so as to affect a distribution concentrated and dispersed degree of current on the antenna frame body. The antenna structure 100 increases a current distribution area of a middle/high band (MHB) CRLH mode (for example, adjusts an electrical length of the second radiation part F2) and also cooperates with a parasitic frame body of a middle/high band (MHB) to shunt current, so as to reduce the SAR. In addition, for a slot (that is, the second slot 121) provided in the side frame body, a low band (LB) bottom feed is used, and the CRLH mode is mainly used as the resonance mode. Different from an IFA mode, the CRLH mode has the characteristics of miniaturization and being mainly based on transverse components, thereby being less affected by side curved screens. Further, side slots can help improve a side longitudinal component; in addition, joint tuning of switches can improve low band (LB) FS efficiency and also adjust a middle/high band (MHB) parasitic resonance, so that characteristics of middle/high band (MHB) performance and low SAR are ensured, and power does not need to be greatly reduced to control the SAR.

The foregoing implementations are merely intended to describe the technical solutions of the present invention, but not intended to constitute any limitation. Although the present invention is described in detail with reference to the foregoing example implementations, a person of ordinary skill in the art should understand that modifications or equivalent replacements can be made to the technical solutions of the present invention without departing from the spirit and scope of the technical solutions of the present invention. A person skilled in the art can also make various changes to design of the present invention without departing from the spirit of the present invention, provided that such changes do not deviate from the technical effects of the present invention. These changes that are made in accordance with the spirit of the present invention shall fall within the protection scope of the present invention.

What is claimed is:

1. An antenna structure for an electronic device, wherein the antenna structure comprises a frame body, a first feed-in part, and a first connection part, wherein the frame body is at least partially made of a metal material, the frame body comprises at least a first part and a second part, the second part is connected to one end of the first part, a length of the second part is greater than a length of the first part, a first slot is provided in the first part, a second slot is provided in the second part, a part of the frame body between the first slot and the second slot forms a first radiation part, the first feed-in part is located on the first radiation part, the first feed-in part is electrically connected to a first feed to fed a current signal into the first radiations part, and the first connection part is located on the first radiation part;

the frame body further comprises a third part, wherein the third part and the second part face toward each other and are connected to the other end of the first part, a third slot is further provided in the first part, a distance from the first slot to the second part is smaller than a distance from the third slot to the second part, a ground point is located on the third part or the first part, a part of the frame body between the ground point and the third slot forms a second radiation part, the antenna structure further comprises a second feed-in part, the second feed-in part is located on the second radiation part, and the second feed-in part is electrically connected to a second feed to feed a current signal into the second radiation part;

the antenna structure further comprises a third connection part and a third tuning unit, wherein the third connection part is located on the second radiation part and located on the first part of the frame body, a distance from the second feed-in part to the third slot is smaller than a distance from the third connection part to the third slot, one end of the third tuning unit is electrically connected to the third connection part and the second feed-in part, the other end of the third tuning unit is grounded.

2. The antenna structure according to claim 1, wherein the antenna structure further comprises a first tuning unit, wherein one end of the first tuning unit is electrically connected to the first feed-in part, the other end of the first tuning unit is grounded, the first tuning unit comprises a first tuning branch, a second tuning branch, and at least one first switch unit, the first tuning branch comprises a capacitor or an inductor, and the second tuning branch comprises a capacitor or an inductor.

3. The antenna structure according to claim 1, wherein a part of the frame body between the first slot and the third slot is configured to form a parasitic stub of the first radiation part, so as to enable the antenna structure to generate an additional resonance.

4. The antenna structure according to claim 1, wherein a part of the frame body between the first slot and the first connection part is configured to form a parasitic stub of the second radiation part, and the parasitic stub of the second radiation part is configured to disperse distribution of current on the second radiation part.

5. An electronic device, wherein the electronic device comprises an antenna structure, wherein the antenna structure comprises a frame body, the frame body is at least partially made of a metal material, the frame body comprises at least a first part, a second part, and a third part, the second part and the third part face toward each other and are connected to two ends of the first part, a length of the second part and a length of the third part are each greater than a length of the first part, a first slot, a second slot, and a third slot are provided in the frame body, the first slot and the third slot are provided in the first part, the second slot is provided in the second part, a distance from the first slot to the second part is smaller than a distance from the third slot to the second part, a part of the frame body between the first slot and the second slot forms a first radiation part, a ground point is located on the third part or the first part, a part of the frame body between the ground point and the third slot forms a second radiation part, a first feed-in part is located on the first radiation part, the first feed feeds a current signal into the first radiation part, a second feed-in part is located on the second radiation part, and the second feed-in part feeds a current signal into the second radiation part;

the antenna structure further comprises a third connection part and a third tuning unit, wherein the third connection part is located on the second radiation part and located on the first part of the frame body, a distance from the second feed-in part to the third slot is smaller than a distance from the third connection part to the third slot, one end of the third tuning unit is electrically connected to the third connection part and the second feed-in part, the other end of the third tuning unit is grounded.

6. The electronic device according to claim 5, wherein the antenna structure further comprises a first tuning unit, wherein one end of the first tuning unit is electrically connected to the first feed-in part, the other end of the first tuning unit is grounded, the first tuning unit comprises a first tuning branch, a second tuning branch, and at least one first switch unit, the first tuning branch comprises a capacitor or an inductor, and the second tuning branch comprises a capacitor or an inductor.

7. The electronic device according to claim 5, wherein the antenna structure further comprises a first connection part, a second connection part, and a second tuning unit, wherein the first connection part and the second connection part are located on the first radiation part at an interval and located on the second part of the frame body, a distance from the second connection part to the second slot is greater than a distance from the first connection part to the second slot, one end of the second tuning unit is electrically connected to the first connection part and the second connection part, the other end of the second tuning unit is grounded, the second tuning unit comprises a third tuning branch, a fourth tuning branch, and at least one second switch unit, the third tuning branch comprises a capacitor or an inductor, and the fourth tuning branch comprises a capacitor or an inductor.

8. The electronic device according to claim 5, wherein a part of the frame body between the first slot and the third slot is configured to form a parasitic stub of the first radiation part, so as to enable the antenna structure to generate an additional resonance.

9. The electronic device according to claim 7, wherein a part of the frame body between the first slot and the first connection part is configured to form a parasitic stub of the second radiation part, and the parasitic stub of the second radiation part is configured to disperse distribution of current on the second radiation part.

10. The electronic device according to claim 5, wherein the frame body is a metal frame of the electronic device, the first part is a bottom metal frame of the electronic device, and the second part and the third part are side metal frames of the electronic device, wherein the bottom metal frame is provided with a USB interface module, a sound cavity, or a card holder.

11. An electronic device, wherein the electronic device comprises:

an antenna structure, wherein the antenna structure comprises:

a frame body, wherein the frame body comprises at least a first part, a second part, and a third part, the second part and the third part face toward each other and are connected to two ends of the first part, a length of the second part and a length of the third part are each greater than a length of the first part, a first slot and a third slot are provided in the first part, a distance from the first slot to the second part is smaller than a distance from the third slot to the second part; a second slot is provided in the second part;

a first radiation part, a first connection part, and a first feed-in part, wherein a part of the frame body between the first slot and the second slot forms a first radiation part, the first connection part and the first feed-in part are located on the first radiation part;

a second radiation part, a ground point, and a second feed-in part, wherein the ground point is located on the third part or the first part, a part of the frame body between the ground point and the third slot forms the second radiation part; the second feed-in part is located on the second radiation part, wherein the antenna structure is configured to simultaneously generate a first resonance and a second resonance when a first signal is fed into the first radiation part via the first feed-in part, a part of the frame body between the first slot and the third slot is configured to form a first parasitic stub of the first radiation part, the antenna structure is configured to generate a third resonance based on the first parasitic stub when the first signal is fed into the first radiation part via the first feed-in part, wherein the third resonance is different from the first resonance and the second resonance; and wherein a part of the frame body between the first slot and the first connection part is configured to form a second parasitic stub of the second radiation part, the antenna structure is configured to disperse distribution of current on the second radiation part based on the second parasitic stub when a second signal is fed into the second radiation part via the second feed-in part, wherein the second signal is different from the first signal.

12. The electronic device according to claim 11, wherein the antenna structure further comprises a third connection part and a third tuning unit, the third connection part is located on the second radiation part, a distance from the second feed-in part to the third slot is smaller than a distance from the third connection part to the third slot, one end of the third tuning unit is electrically connected to the third connection part and the second feed-in part, the other end of the third tuning unit is grounded.

13. The electronic device according to claim 11, wherein a frequency of the third resonance is less than a frequency of the first resonance.

14. The electronic device according to claim 11, wherein the first connection part is directly grounded or grounded by an inductor.

15. The electronic device according to claim 11, wherein an electrical length of the first radiation part is close to one-half of a wavelength corresponding to a frequency of the second resonance.

16. The electronic device according to claim 11, wherein a distance from the second feed-in part to the third slot is smaller than a distance from the ground point to the third slot.

17. The electronic device according to claim 11, wherein the antenna structure further comprises a first tuning unit, one end of the first tuning unit is electrically connected to the first feed-in part, the other end of the first tuning unit is grounded, the first tuning unit is configured to adjust a parasitic resonance frequency of the first radiation part.

18. The electronic device according to claim 11, wherein the first radiation part is configured to generate a radiation signal in a first radiation band, the first radiation band is low band; the second radiation part is configured to generate a radiation signal in a second radiation band, the second radiation band is middle/high band.

19. The electronic device according to claim 11, wherein the first feed-in part is electrically connected to a first feed to feed the first signal into the first radiation part; the second feed-in part is electrically connected to a second feed to feed the second signal into the second radiation part, the second feed is different from the first feed.

20. The electronic device according to claim 12, wherein the third tuning unit comprises a fifth tuning branch, a sixth tuning branch, and at least one third switch unit, the fifth tuning branch comprises a capacitor or an inductor, and the sixth tuning branch comprises a capacitor or an inductor.

* * * * *